United States Patent [19]
Nakamura et al.

[11] Patent Number: 5,353,047
[45] Date of Patent: Oct. 4, 1994

[54] BEAM SCANNING OPTICAL SYSTEM

[75] Inventors: Hiromu Nakamura; Akiyoshi Hamada, both of Toyokawa, Japan

[73] Assignee: Minolta Co., Ltd., Osaka, Japan

[21] Appl. No.: 795,127

[22] Filed: Nov. 20, 1991

[30] Foreign Application Priority Data

Nov. 22, 1990 [JP] Japan .................. 2-319722

[51] Int. Cl.⁵ .................................. B41J 2/435
[52] U.S. Cl. ........................ 346/108; 359/208
[58] Field of Search ........... 346/107 R, 108, 76 L, 346/160; 359/208, 217, 218

[56] References Cited

U.S. PATENT DOCUMENTS 4,533,246 8/1985 Braun .................. 356/317
4,585,296 4/1986 Minoura et al. .
4,759,593 7/1988 Kessler .................. 359/208
4,941,719 7/1990 Hisada et al. .
4,984,858 1/1991 Kuroda .................. 359/208
5,038,156 8/1991 Kuroda .
5,093,745 3/1992 Kuroda .................. 359/217

FOREIGN PATENT DOCUMENTS 3644124 11/1988 Fed. Rep. of Germany .

*Primary Examiner*—Mark J. Reinhart
*Attorney, Agent, or Firm*—Price, Gess & Ubell

[57] ABSTRACT

A toroidal mirror reflects a light beam deflected by a deflection device with a mirror plane curved in a scanning direction and leads a spot of the light beam so as to move substantially at a uniform velocity on a light receiving surface.

18 Claims, 11 Drawing Sheets

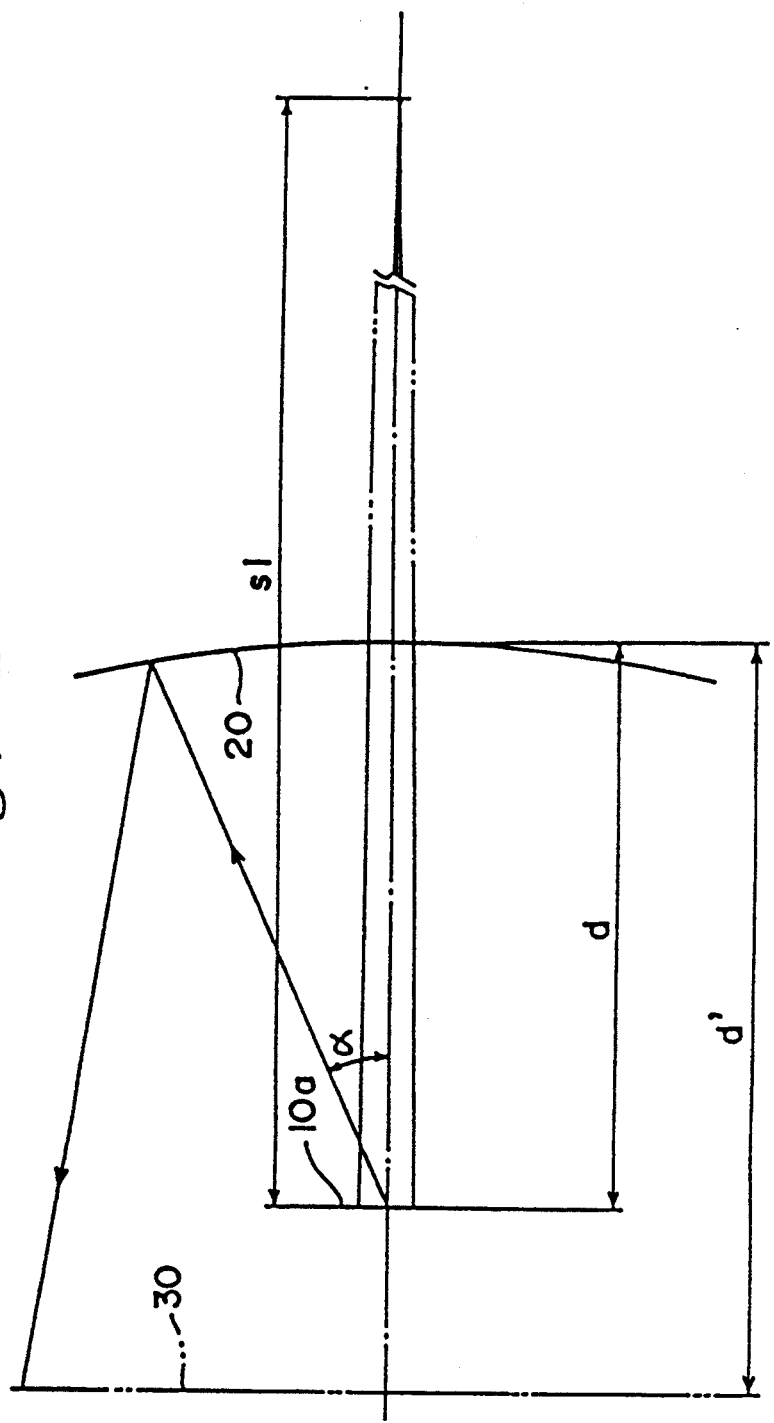

EXPERIMENTAL EXAMPLE I
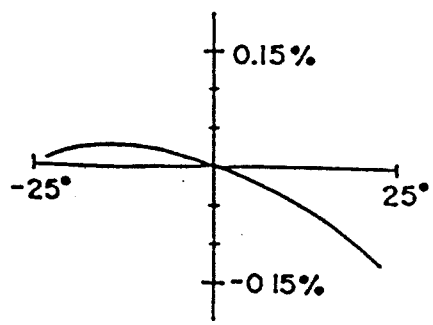 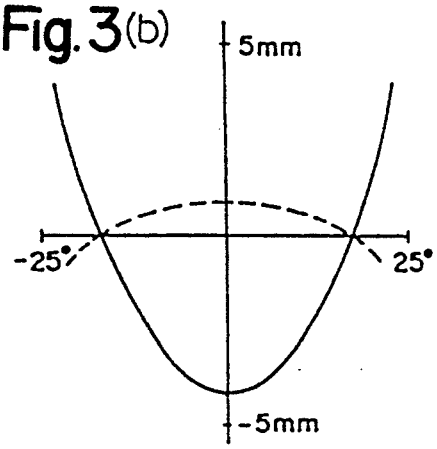
Fig.3(a) Fig.3(b)
EXPERIMENTAL EXAMPLE II
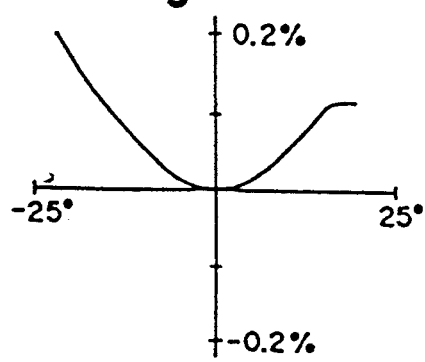 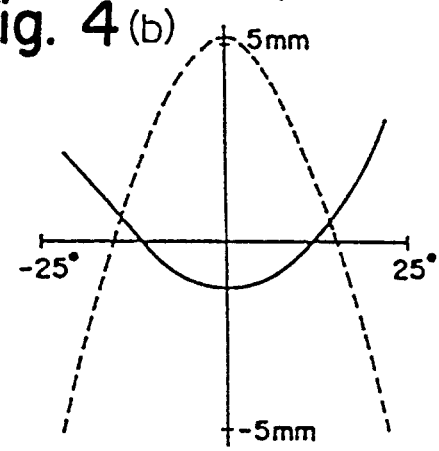
Fig.4(a) Fig.4(b)
EXPERIMENTAL EXAMPLE III
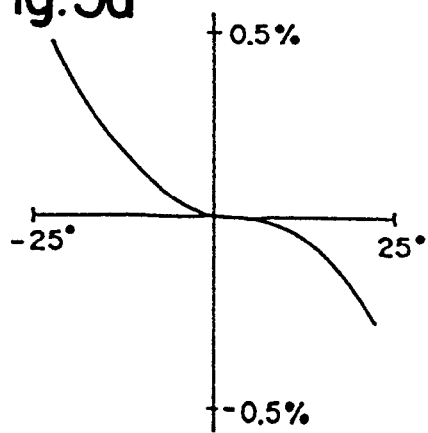 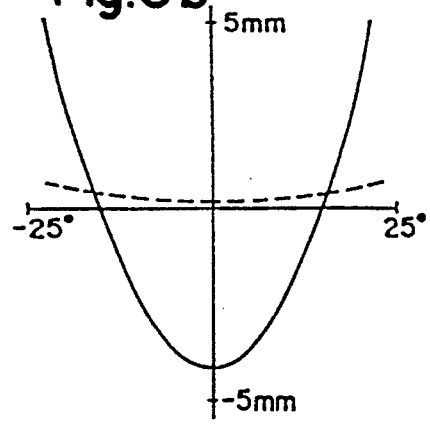
Fig.5a Fig.5b

EXPERIMENTAL EXAMPLE IV

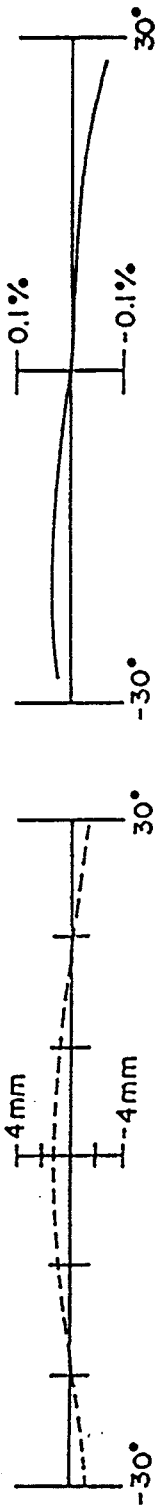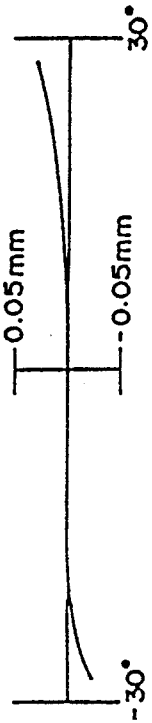

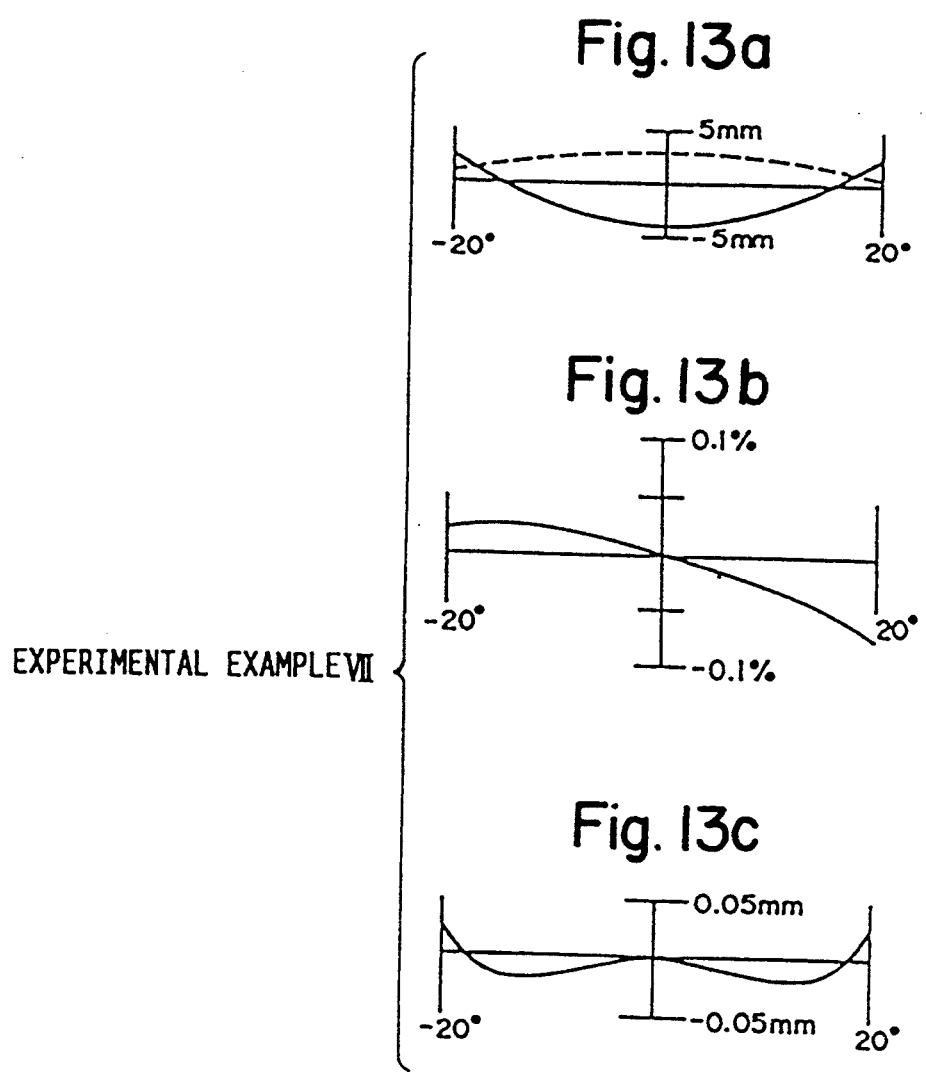

EXPERIMENTAL EXAMPLE VIII

BEAM SCANNING OPTICAL SYSTEM

BACKGROUND OF THE INVENTION

1. Technical Field of the Invention

The present invention relates to a beam scanning optical system, and more particularly, to a structure of a beam scanning optical system incorporated in laser beam printers, facsimiles and the like for collecting a luminous flux provided with image information on a scanning medium.

2. Brief Description of Related Art

A beam scanning optical system which has heretofore been utilized in laser beam printers and facsimiles basically comprises a semiconductor laser as a light source, a deflection device such as polygon mirror and galvano mirror, and an fθ lens. The deflection device is utilized for deflecting a luminous flux emitted from the semiconductor laser at an equiangular velocity in a main scanning direction. With the deflection, however, a difference in a scanning speed occurs at a light collecting surface over a range from central portion to both edges in the main scanning direction and a uniform image can not be obtained. An fθ lens is therefore provided for correcting the difference in the scanning speed.

Since the fθ lens must be made by combining various concave lenses and convex lenses, lens planning is extremely complicated. Because of a number of lens surfaces to be ground, manufacturing process of the Fθ lens requires higher accuracy and higher cost. Moreover, the fθ lens has a problem that various lenses of the fθ lens must be made of a limited material which possesses good permeability.

In U.S. Pat. No. 5,038,156, there is proposed a compact optical system wherein a spherical mirror which can be manufactured easier with higher accuracy is used in place of the fθ lens. Further, there are proposed optical systems wherein a toroidal lens is added to the optical system in order to rectify a tilt error of a deflection device (U.S. Pat. No. 4,984,858). On the other hand, an optical system wherein a single lens (toric lens) is provided to have Fθ function and a tilt error correcting function is disclosed in U.S. Pat. No. 4,585,296.

However, in the optical system which is provided with the tilt error correcting function, a free space for disposing parts is reduced since a lens for the tilt error correction is added, and it greatly affects small sized printers. Being a lens, there is also a limitation with respect to its material like the fθ lens. If a plastic which can be manufactured easily in mass production is used, a refractive index is varied by temperature, and the refractive index of the lens is variably distributed from the circumferential portion toward the central portion since the plastic itself possesses moisture absorption characteristics. If a material such as polycarbonate which is less in moisture absorption is used, there arises a problem of double refraction in practical use. If, a glass is used, a stabilized characteristic may be obtained, however, it makes a manufacturing process difficult since the lens is not spherical to eventually raise a manufacturing cost and is not suitable for mass production.

SUMMARY OF THE INVENTION

A subject of the present invention is to provide a beam scanning optical system which is provided with an fθ function (correcting functions for the curvature of field and deflection aberration) and a tilt error correcting function by using a mirror which is not limited a specific material.

These and other objects and features of the present invention will become more apparent from the following description taken in conjunction with the accompanying drawings which illustrate a specific embodiment of the invention.

BRIEF DESCRIPTION OF THE DRAWINGS

FIG. 2 is a view showing a light path on a deflection surface of an optical system.

FIGS. 3a, 4a, 4b, 5a, 5b are graphs showing aberrations on the surface of a photoconductor which is an object to be scanned in an optical system.

FIGS. 10a, 10b, 10c, 11a, 11b, 12a, 12b, 12c, 13a, 13b, 13c, 14a, 14b and 14c are graphs showing aberrations on the surface of a photoconductor which is an object to be scanned in an optical system.

It is to be noted that like members are designated by like numerals throughout each embodiment, and repeated descriptions will be omitted.

DESCRIPTION OF THE PREFERRED EMBODIMENT

Description will be made hereinafter on some of the embodiments of the present invention referring to the accompanying drawings.

(First Embodiment—FIGS. 1 through 5)

Figure 1:
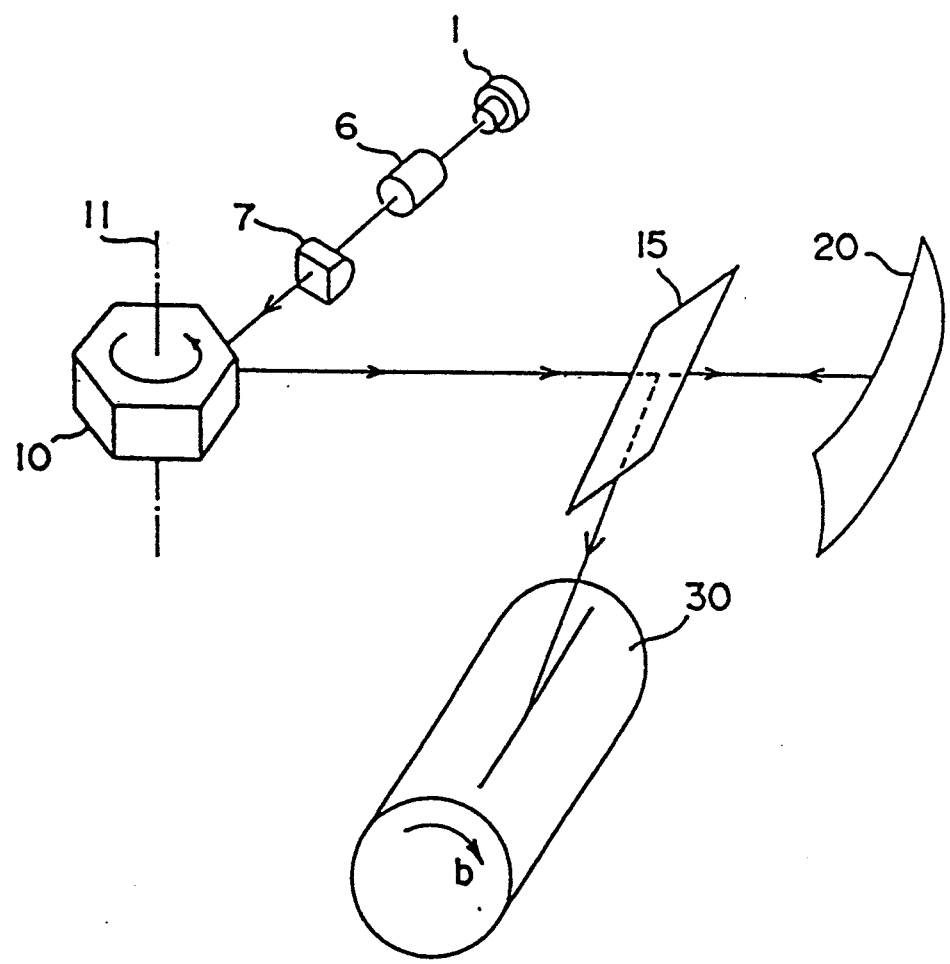
FIG. 1 is a perspective view showing a schematic structure of a beam scanning optical system as a first embodiment of the present invention.

In FIG. 1, reference numeral 1 designates a semiconductor laser, 6 a collimator lens, 7 a cylindrical lens, 10 a polygon mirror, 15 a half mirror, 20 a toroidal mirror and 30 a photoconductor in drum shape.

The semiconductor laser 1 is intensely modulated (on, off) by an unillustrated control circuit and radiates an emitting luminous flux provided with image information. The emitted luminous flux is rectified to a convergent luminous flux by passing through the collimator lens 6. The converged luminous flux further converges in the main scanning direction by passing through the cylindrical lens 7. Practically, it linearly converses-in the vicinity of reflective surface of the polygon mirror 10.

The polygon mirror 10 is rotatively driven by an unillustrated motor in the direction of arrow (a) at a constant speed centering on a shaft 11. The convergent luminous flux emitted from the cylindrical lens 7 is successively reflected by each reflective surface of the polygon mirror 10 and deflected at an equiangular velocity. The deflected luminous flux passes through the half mirror 15 and is then reflected by the toroidal mirror 20 and further by the half mirror 15 to be collected onto the surface of the photoconductor 30. The spot of the collected luminous flux moves at a uniform velocity in the axial direction of the photoconductor 30 according to the rotation of the polygon mirror 10. This scanning is called main scanning. The photoconductor 30 is rotatively driven at a constant speed in the direction of arrow (b), and the scanning by this rotation of the photoconductor 30 is called sub-scanning.

The toroidal mirror is a mirror constituted of reflective surfaces (toroidal facets) having two different centers of curvature in two main longitudinal lines. Its concrete structure will be described later as an experimental example.

In the beam scanning optical system with the construction as described above, an image (an electrostatic latent image) is formed on the surface of the photoconductor 30 by intense modulation of the semiconductor laser 1 with the main scanning and sub-scanning. And, in place of the conventional fθ lens, the toroidal mirror 20 rectifies a scanning speed in the main scanning direction (deflection aberration) to be uniform over the range from the center to both edges of scanning area, and the curvature of the field in the main scanning direction on the photoconductor 30 is also rectified.

The toroidal mirror 20 rectifies an inclination of the rotational axis of the polygon mirror 10, and at the same time, lessens the curvature of the field on the photoconductor 30 in the sub-scanning direction. In other words, if there occurs a tilt error on each reflective facet of the polygon mirror 10, a scanning line on the photoconductor 30 deviates in the sub-scanning direction and an irregular pitch is produced on an image. The tilt error can be rectified by setting each reflective facet of the polygon mirror 10 and the light collecting surface of the photoconductor 30 in a conjugate relation in the section perpendicular to the main scanning direction.

In this embodiment, a luminous flux is collected onto the polygon mirror 10 by the cylindrical lens 7, and each reflective facet and light collecting surface are arranged to maintain a conjugate relation by the toroidal mirror 20. According to this embodiment, it is also arranged to rectify an emitting luminous flux to a convergent luminous flux by the collimator lens 6 so that the curvature of the field on a light collecting point (image forming plane) on the photoconductor 30 can be rectified. In other words, when a parallel luminous flux or divergent luminous flux enters the polygon mirror 10 (the same as those of other rotative deflection devices), the light collecting point after reflection becomes almost a circular arc centering on the point of reflection and produces a curvature of the field, assuming that no optical member is provided behind the polygon mirror 10. If a convergent luminous flux enters into the polygon mirror 10, the curvature of the field becomes concave faced to the direction of incidence of light.

The distance between the toroidal mirror 20 and an image plane is changed according to the state of convergence of incident light. The curvature of the field is also changed according to the change of the distance between the toroidal mirror 20 and the image plane. In other words, the curvature of the field produced by the reflective surface of the toroidal mirror 20 is rectified by the curvature of the field produced by the convergent luminous flux to result in making the curvature of the field at the light collecting surface smaller and the level of the image plane is improved.

When the curvature of the field becomes smaller, the variation in the diameter of convergent luminous flux caused by the difference in scanning position (image height) becomes smaller, and an optical system can be utilized in wider angles. Moreover, image can be more densely produced since the diameter of convergent luminous flux can be made smaller.

The present embodiment will further be described more in detail.

As shown in FIG. 2, the relationship between a radius of curvature ($R_H$) of the toroidal mirror 20 in the main scanning direction, a radius of curvature ($R_V$) of the toroidal mirror 20 in the sub-scanning direction and the distance d from a point of deflection 10a of the polygon mirror 10 to the toroidal mirror 20, and the relationship between said distance d and the distance d' from the toroidal mirror 20 to the photoconductor 30 are set to preferably fulfill the following equations.

$$0.1 < (d/|R_H|) < 0.7 \quad (1)$$

$$0.5 < (|d'/d|) < 2 \quad (2)$$

$$0.5 < (|d'/R_V|) < 2 \quad (3)$$

In FIG. 2, s1 represents a distance from the reflective surface 10a of the polygon mirror to the light collecting point assuming that no toroidal mirror is provided. When the above equations (1), (2) and (3) are fulfilled, satisfactory distortion characteristics as well as satisfactory level of image plane can be obtained over the wide range of angles. The minimum and maximum values in each one of the above equations are set within the experientially permissible range of image distortion on the photoconductor 30.

If the value exceeds the minimum limit in the equation (1), i.e. if the radius of curvature ($R_H$) in the main scanning direction of the toroidal mirror is made larger, positive distortion is increased according to the increment of angle of deflection and a convex curvature of the field is increased. If, on the other hand, the value exceeds the maximum limit in the equation (1), i.e. if the radius of curvature ($R_H$) in the main scanning direction of the toroidal mirror is made smaller, negative distortion is increased according to the increment of angle of deflection and a concave curvature of the filed is increased.

If the value exceeds the minimum limit in the equation (2), i.e. if said s1 is made smaller, positive distortion is increased according to the increment of angle of deflection and a convex curvature of the field is increased. If, on the other hand, the value exceeds the maximum limit in the equation (2), i.e. if the s1 is made larger, negative distortion is increased according to the increment of angle of deflection and a concave curvature of the field is increased.

If the value exceeds the minimum limit in the equation (3), i.e. if the radius of curvature in the sub-scanning direction of the toroidal mirror is made larger, the position of image plane in the sub-scanning direction is displaced to the positive side. If, on the other hand, the value exceeds the maximum limit in the equation (3), i.e. if the radius of curvature in the sub-scanning direction of the toroidal mirror is made smaller, the position of image plane in the sub-scanning direction is displaced to the negative side.

The constructional data in the experimental examples I, II and III in the first embodiment of the present invention will be shown in Table 1, and the characteristic data in FIGS. 3, 4 and 5 respectively.

TABLE 1

|  | EXPERIMENTAL EXAMPLES | | |
| --- | --- | --- | --- |
|  | I | II | III |
| Diameter of Inscribed Circle of Polygon Mirror mm | 30 | 30 | 30 |
| Radius of Curvature of Toroidal Mirror |  |  |  |
| Main Scanning Direction ($R_H$) mm | −600 | −600 | −700 |
| Sub-scanning Direction ($R_V$) mm | −198 | −187 | −184 |
| Point of Object (s1) mm | 746.8 | 1858.8 | 472.4 |
| Distance from Point of Deflection to Toroidal Mirror (d) mm | 200 | 150 | 250 |
| Distance from Toroidal Mirror to Photoconductor (d') mm | −200 | −250 | −150 |
| $|d/R_H|$ | 0.33 | 0.25 | 0.36 |
| $|d'/d|$ | 1.0 | 1.7 | 0.6 |
| $|d/R_V|$ | 1.0 | 0.8 | 1.4 |

The aberrations at the light collecting surface on the photoconductor in each one of the above experimental examples I, II and III are shown in FIGS. 3, 4 and 5. In each one of the figures (a), angle of deflection is shown by horizontal axis and degree of distortion (aberration of deflection) by vertical axis. In each one of the figures (b), angle of deflection is shown by horizontal axis and degree of curvature by vertical axis. A dotted line shows curvature of the field by a luminous flux in the deflection plane (the curvature of the field in the main scanning direction), a solid line shows curvature of the field by a luminous flux in the vertical plane with respect to the deflection plane (the curvature of the field in the sub-scanning direction).

(Second Embodiment—FIGS. 6 through 15)

In a second embodiment of the present invention, a toroidal mirror 20 is placed at an angle ($\theta Y$) on a plane perpendicular to the main scanning direction wherein the half-mirror 15 shown in the first embodiment is eliminated. With elimination of the half-mirror, the amount of light attenuation can be remarkably reduced.

Figure 6:
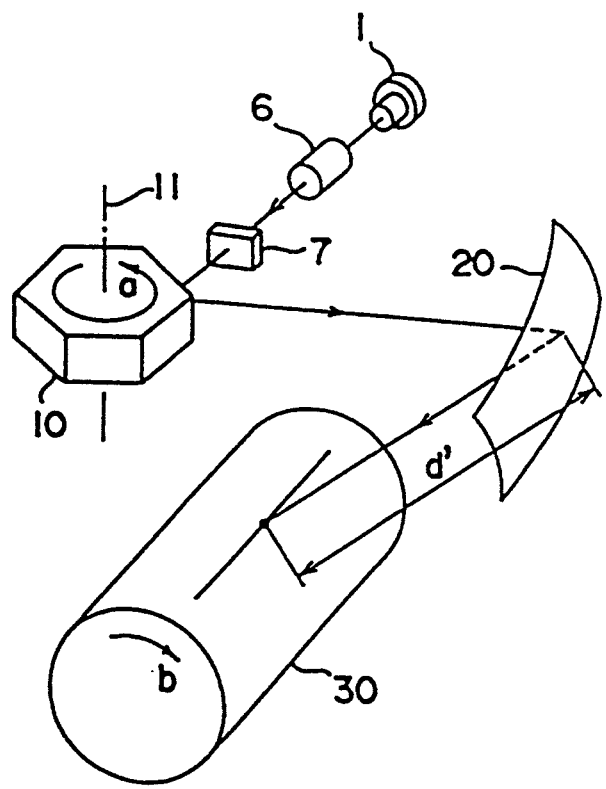
FIG. 6 is a perspective view showing a schematic structure of a beam scanning optical system as a second embodiment of the present invention wherein a half mirror is omitted.
Figure 7:
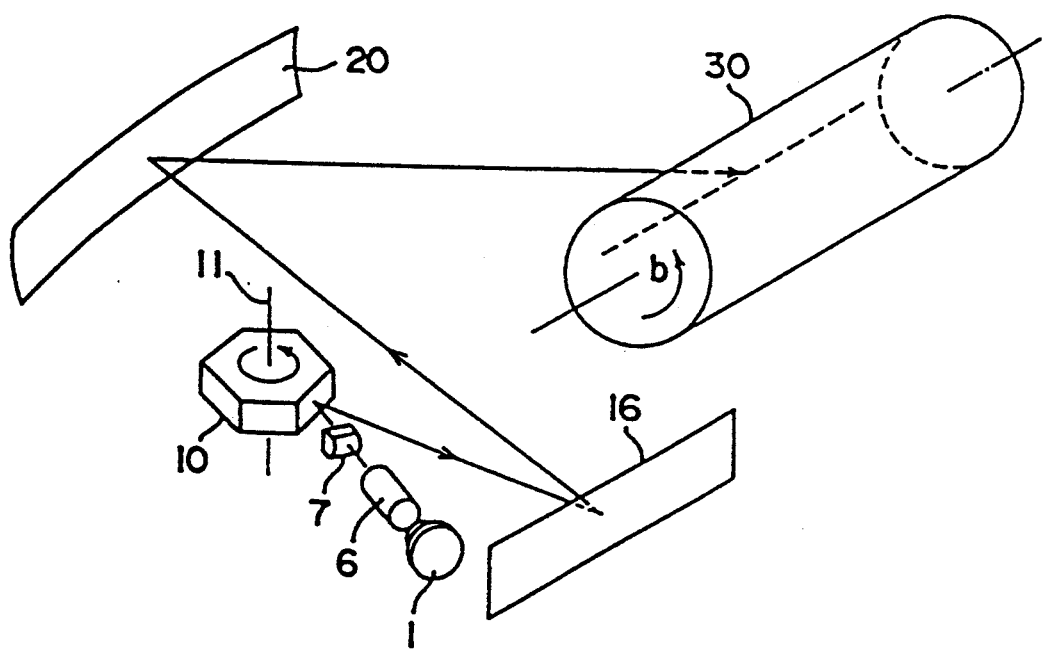
FIG. 7 is a perspective view showing a schematic structure of another type of beam scanning optical system of the present invention wherein a half mirror is omitted.
Figure 8:
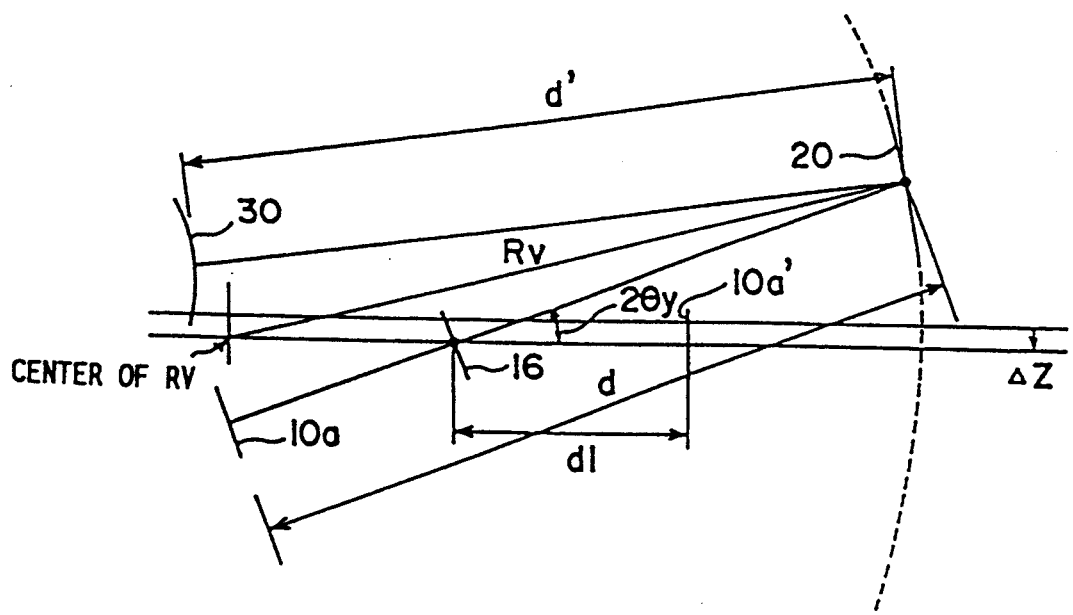
FIG. 8 is a view showing a light path on the surface where deflection surfaces of the optical systems shown in FIGS. 6 and 7 are perpendicularly intersected.

FIG. 6 shows a state how a luminous flux deflected by a polygon mirror 10 enters into a toroidal mirror 20 directly. FIG. 7 illustrates a state how a luminous flux deflected by the polygon mirror 10 enters the toroidal mirror 20 through a plane mirror 16 (by folding an optical path). In FIG. 8, a plane of deflection 10a shows a case when it is applied to the optical system shown in FIG. 6, and the plane of deflection 10a' and the plane mirror 16 show a case when they are applied to the optical system shown in FIG. 7 respectively. When the toroidal mirror 20 is tilted, there occurs a curve in the scanning line. In order to solve such an inconvenience, it may be arranged to move the toroidal mirror 20 in parallel by ($\Delta Z$) in the sub-scanning direction, the direction the beam enters, under a state that the toroidal mirror 20 is inclined.

A concrete constructional data is shown in the following Table 2 as an experimental example IV.

TABLE 2

|  | EXPERIMENTAL EXAMPLE IV |
| --- | --- |
| Diameter of Inscribed Circle of Polygon Mirror | 30 |
| Radius of Curvature of Toroidal Mirror |  |
| Main Scanning Direction ($R_H$) mm | −750 |
| Sub-scanning Direction ($R_V$) mm | −251.3 |
| Point of Object (s1) mm | 996 |
| Distance from Point of Deflection to Toroidal Mirror (d) mm | 250 |
| Distance from Toroidal Mirror to Photoconductor (d') mm | −250 |
| Distance from Point of Deflection to Plane Mirror (d1) mm | 100 |
| Angle of Inclination of Plane Mirror ($\ominus$ y) | 5° |
| d/RH | 0.33 |
| d'/d | 1.0 |
| Amount of Parallel Movement of Toroidal Mirror ($\Delta Z$) mm | 3.0 |

Figure 10:
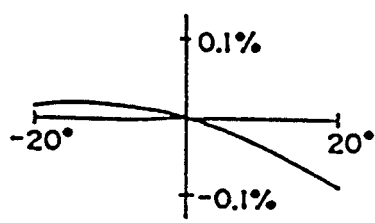
Figure 10:
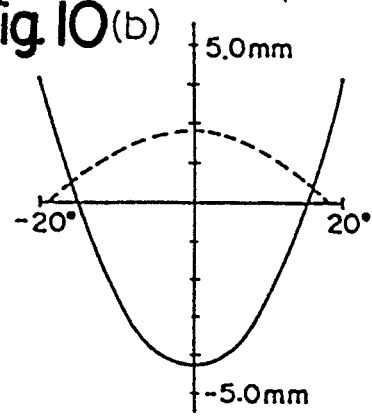
Figure 10:
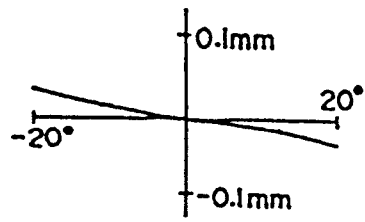
Figure 14A:
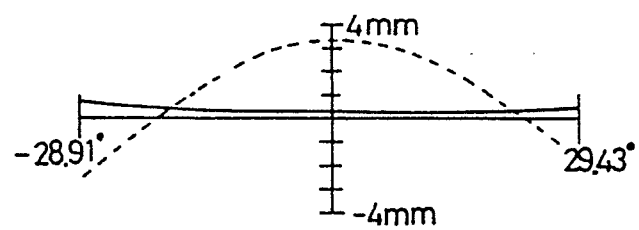
Figure 14B:
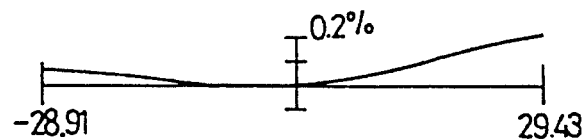
Figure 14C:
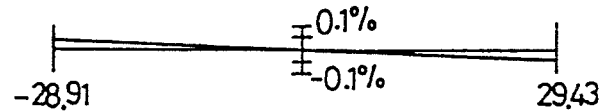

In the state of this experimental example IV, the equations (1), (2) and (3) shown in the first embodiment of the present invention may also be applied as preferable conditional equations. The aberration at the light collecting surface on the photoconductor in the experimental example IV is shown in FIG. 10. In the figure, (a) and (b) are similar graphs to the aberration graphs shown in FIGS. 3, 4 and 5 of the experimental examples in the first embodiment of the present invention, and (c) is a graph showing an angle of deflection by horizontal axis and light collecting position in the sub-scanning direction by vertical axis to show the slippage of position in the direction perpendicular to the plane of deflection in the scanning line (sub-scanning direction), i.e. a curve in the scanning line.

When a radius of curvature in the main scanning direction on the toroidal plane is set so as to be adequate for rectifying the deflection aberration and the field of the curvature in the main scanning direction by using an ordinary toroidal mirror as an reflective system, a positive field of the curvature is increased in the sub-scanning direction accompanying the increment in the angle of deflection (the angle of field). In order to rectify the increment, it may be arranged to make the radius of curvature smaller in the sub-scanning direction on the toroidal plane according to the increment of the angle of field.

In the case where a beam enters at an angle relative Go the toroidal mirror 20 as illustrated in FIG. 8, there occurs a curve of concave scanning line on an image plane since the reflective point on the toroidal plane is displaced toward this side according to the increment of the angle of field. In order to rectify such an inconvenience, it may be arranged to displace the height of the bus or generatrix on the toroidal plane in the reverse direction to the direction of incidence of the luminous flux relative to the bus of original toroidal plane according to the increment of the angle of field. If the displacement is made vertically relative to the plane which includes the bus of the original toroidal plane, it will be advantageous since the beam retains its shape.

In view of the above, a concrete constructional data will be shown in the following Table 3 as experimental examples V, VI, VII and VIII wherein the curvature of the field and deflection aberration have been rectified.

TABLE 3

| | EXPERIMENTAL EXAMPLES | | | |
|---|---|---|---|---|
| | V | VI | VII | VIII |
| Diameter of Inscribed Circle of Polygon Mirror | 30 | 30 | 30 | 30 |
| Radius of Curvature of Toroidal Mirror | | | | |
| Main Scanning Direction ($R_H$) mm | −300 | −490 | −750 | −490 |
| Sub-scanning Direction ($R_V$) mm | * | * | 252 | * |
| Point of Object (s1) mm | +637 | +414 | +1002.3 | +676 |
| Distance from Point of Deflection to Toroidal Mirror (d) mm | 100 | 159 | 250 | 143 |
| Distance from Toroidal Mirror to Photoconductor (d′) mm | −100 | −164 | −250 | −163.5 |
| Angle of Inclination of Toroidal Mirror ($\Theta y$) | 0 | 14.5° | 10° | 3.5° |
| $|d/R_H|$ | 0.33 | 1.32 | 0.33 | 0.29 |
| $|d'/d|$ | 1.0 | 1.03 | 1.0 | 1.14 |
| $|d/R_V|$ | 1.0~1.11 | 1.03~0.98 | 0.99 | 0.93~0.97 |

In the above experimental examples V, VI, VII and VIII, it is also preferable to satisfy the following conditional equations.

$$0.1 < (d/|R_V|) < 0.7 \quad (1)$$

$$0.5 < (|d'/d|) < 2 \quad (2)$$

$$0.5 < (|d/R_V|) < 2 \quad (3)$$

The equations (1), (2) and (3) stated above are the same as those of (1), (2) and (3) shown in the first embodiment of the present invention, and the same explanation made therein can be applied to the present embodiment.

With regard to the correction of the curvature of field using a toroidal mirror, variations of the radius of curvature in the sub-scanning direction on the toroidal plane are shown in the following Tables 4, 5 and 6 based on the experimental examples V, VI and VIII respectively. Further, with regard to the correction of deflection aberration, variations of the height of bus on the toroidal plane are shown in the Tables 5 and 6 based on the experimental examples VI and VIII respectively.

Figure 9:
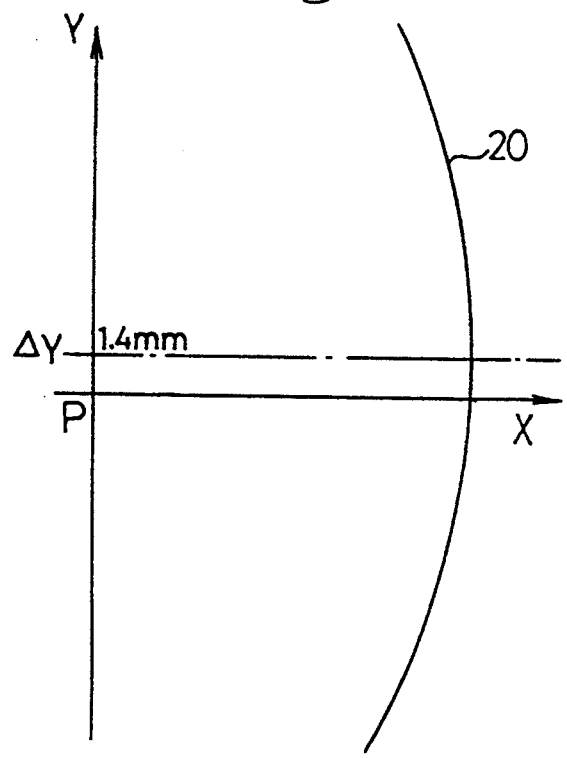
FIG. 9 is a drawing typically showing the disposition of a mirror in an optical system wherein the disposition of a toroidal mirror is improved.

The experimental example VIII shows a case when the numerical data in the experimental example VI are changed. As clearly shown in the Tables 5 and 6, the height of bus is varied with a change in the radius of curvature as in the case of the experimental example VI. Further, the center of the toroidal mirror 20 is shifted by ΔY (=1.4 mm) in the direction of Y (main scanning direction) as illustrated in FIG. 9. Practically, a laser beam is not reflected on a point of polygon mirror, and point of reflection gradually moves according to the rotation of the polygon mirror. This is the reason why the center of the toroidal mirror is shifted in order to compensate for the displacement. An efficient optical system can thus be provided. Consequently, the toroidal mirror 20 forms an asymmetrical shape in the main scanning direction with the angle of field at 0 position (0 position in Y coordinates) as a center.

TABLE 4

| (Free Curved Surface Shape - EXPERIMENTAL EXAMPLE V) | | | | | |
|---|---|---|---|---|---|
| Angle of Field | −45 | −36 | −27 | −19 | −9 | ±0 |
| Radius of Curvature (mm) | 90.7 | 93.7 | 96.5 | 98.5 | 99.6 | 100 |
| Angle of Field | +9 | +18 | +27 | +36 | +45 | |
| Radius of Curvature (mm) | 99.6 | 98.5 | 96.5 | 93.7 | 90.0 | |

TABLE 5

| (Free Curved Surface Shape - EXPERIMENTAL EXAMPLE VI) | | | | | |
|---|---|---|---|---|---|
| Angle of Field | −27.8 | −21.2 | −14.3 | −7.2 | +0 |
| Mirror Y-coordinates | +80 | +60 | +40 | +20 | ±0 |
| Radius of Curvature | 163.0 | 164.75 | 166.0 | 166.75 | 167 |
| Height of Bus | −2.34 | −1.32 | −0.59 | −0.15 | 0 |
| Angle of Field | +7.2 | +14.4 | +21.3 | +28.0 | |
| Mirror Y-coordinates | −20 | −40 | −60 | −80 | |
| Radius of Curvature | 166.75 | 166.0 | 164.75 | 163.0 | |
| Height of Bus | −0.15 | −0.59 | −1.32 | −2.34 | |

TABLE 6

| (Free Curved Surface Shape - EXPERIMENTAL EXAMPLE VIII) | | | | | |
|---|---|---|---|---|---|
| Angle of Field | −44.4 | −34.4 | −25.3 | −16.8 | −8.6 |
| Mirror Y-coordinates | +101.4 | +81.4 | +61.4 | +41.4 | +21.4 |
| Radius of Curvature | −144.237 | −147.627 | −150.359 | −152.363 | −153.588 |
| Height of Bus | −0.89293 | −0.57146 | −0.32144 | −0.14286 | −0.03571 |
| Angle of Field | ±0 | +7.5 | +15.6 | +24.1 | +33.0 | +42.8 |
| Mirror Y-Coordinages | ±0 | −18.6 | −38.6 | −58.6 | −78.6 | −98.6 |
| Radius of | −154.0 | −153.588 | −152.363 | −150.359 | −147.627 | −144.237 |

TABLE 6-continued (Free Curved Surface Shape - EXPERIMENTAL EXAMPLE VIII)

| Curvature Height of Bus | 0 | −0.03571 | −0.14286 | −0.32144 | −0.57146 | −0.89293 |
|---|---|---|---|---|---|---|

The change of a radius of curvature in the subscanning direction of the toroidal plane can be expressed by the following equation (4) in the experimental example V. The unit is expressed in mm.

$$R_Y(\alpha) = \sqrt{R^2 - {}^2} - (R_r - R_{VO}) \quad (4)$$

Rr: Fixed Number (106.25)
$R_{VO}$: Radius of curvature (100) when the angle of field is 0.
α: The angle of field Similarly, the experimental example VI can be expressed by the following equations (5) or (6).

$$R_Y(Y) = \sqrt{R^2 - Y^2} - (R_r - R_{VO}) \quad (5)$$

Rr: 802
$R_{VO}$: 167

$$R_Y(Y) = aY^4 + bY^2 + c \quad (6)$$

a: 0
b: −6.25 × 10⁻⁴
c: 147

The height of bus on the toroidal plane can be expressed by the following equations (7) or (8) in the experimental example VI.

$$Z(Y) = \sqrt{R_Z^2 - Y^2} - R_Z \quad (7)$$

$R_Z$: 1368.69

$$Z(Y) = aY^4 + bY^2 + c \quad (8)$$

a: 6.510 × 10⁻¹⁰
b: −3.698 × 10⁻⁴
c: 0

Figure 15A:
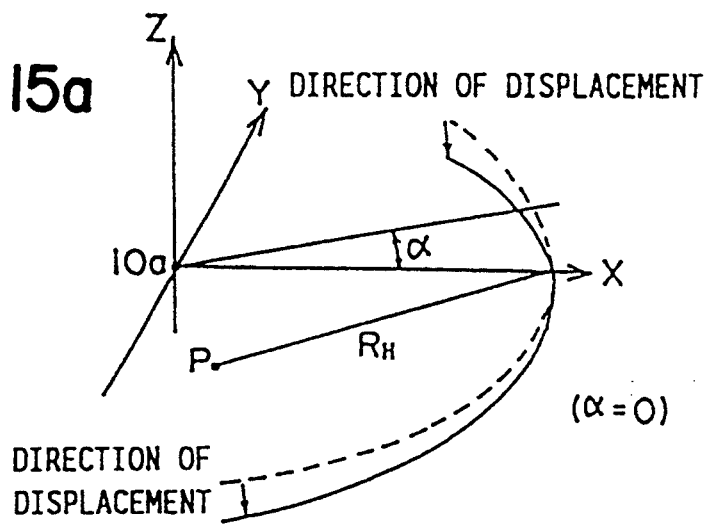
FIG. 15a, 15b and 15c are an explanatory drawing showing a toroidal surface and its displacement of an optical system.
Figure 15B:
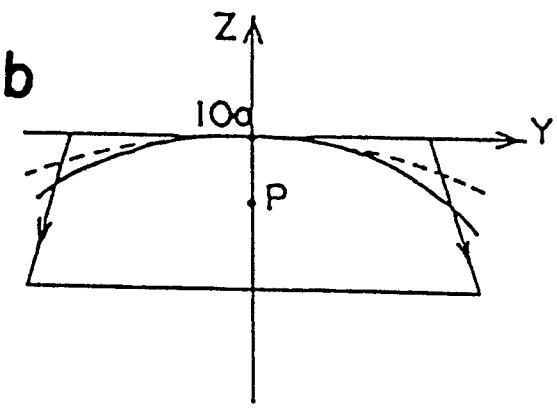
Figure 15C:
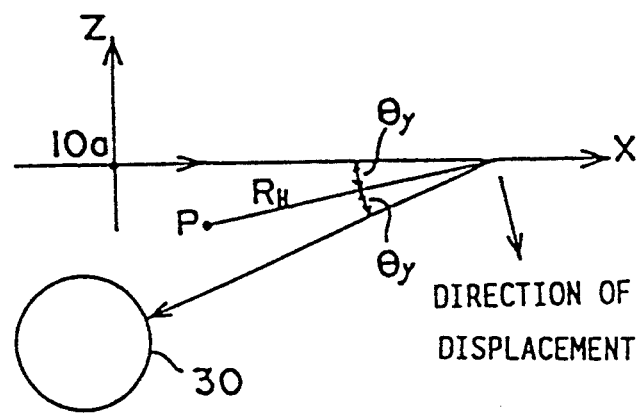

In each one of the equations shown above, coordinate axes are provided as shown in (a), (b) and (c) of FIG. 15. More particularly, the point of origin is set at a point of deflection (10a) of the polygon mirror 10, and the direction where the angle of field (α) becomes 0 is made as the direction of X axis, and by making a scanning plane of the polygon mirror as X-Y plane, the direction perpendicular to the X-Y plane is made as Z axis. At this time, the center P of the bus of the original toroidal plane (a circle within the space shown by dotted line in (a) and (b) of FIG. 15) is within the plane of X-Z, and a displacement direction of the bus of the toroidal plane is shown by arrows in (a) and (c) of FIG. 15. The curve which displaced the bus is shown by solid lines in (a), (b) and (c) of FIG. 15, and a coordinate axis Z is shown in the equations (7) and (8).

The above-described free toroidal plane can be manufactured by a three dimensional processing machine basing on the numerical data calculated by three conditions of a normal line of a circle in the sub-scanning direction (the plane defining a radius of curvature), bus and the curve which passes through the center of a circle in the sub-scanning direction.

FIGS. 11, 12, 13 and 14 show aberrations at the light collecting plane on the photoconductor in the experimental examples V, VI, VII and VIII. In each one of the figures, (a) shows a degree of curvature, (b) a degree of distortion (deflection aberration) and (c) a light collecting position in the sub-scanning direction respectively. The dotted line shows the curvature of the field in the main scanning direction, and the solid line shows the curvature of the field in the sub-scanning direction.

The beam scanning optical system of the present invention is not limited to the embodiments described above, and it may be variably modified within the scope of its essential points. For instance, various kinds of devices can be utilized as a deflection device in place of the polygon mirror 10 if it is capable of scanning a luminous flux on a plane at an equiangular velocity. Any laser generating means and spot light source may also be utilized as a source of light other than the semiconductor laser.

In the above-mentioned embodiments, the luminous flux emitted from the semiconductor laser is rectified to a convergent luminous flux by the collimator lens, however, it may be arranged to simply rectify the emitted luminous flux to a parallel luminous flux.

In the structures described in each one of the above embodiments, a toroidal mirror is provided in the optical path extending from a deflection device to the surface of the photoconductor so that the optical path may simply be provided with a reflective system of toroidal mirror only whereby not only an fθ function but tilt error by the deflection device can be rectified. Moreover, even if a plastic is used for the reflective system, the efficiency of the system is not largely affected by the changes in temperature and humidity compared With a lens system which uses a plastic.

In the structure of reflective surface of a toroidal mirror wherein a radius of curvature in the sub-scanning direction is made smaller according to the increment of an angle of field, the curvature of the field can effectively be rectified. Further, in the structure of reflective surface of a toroidal mirror wherein the height of a bus is displaced in the reverse direction to the direction of incidence of a luminous flux according to the increment of an angle of field, the curve on the scanning line can effectively be rectified.

Although the present invention has been fully described by way of examples with reference to the accompanying drawings, it is to be noted that various changes and modifications will be apparent to those skilled in the art. Therefore, unless otherwise such changes and modifications depart from thee scope of the present invention, they should be construed as being included there in.

What is claimed is:

1. A beam scanning optical system for providing scanning of a beam receiving surface, comprising:
   emitting means for emitting a light beam;
   converging means for converging the light beam emitted from said emitting means into a straight line;
   deflection means for deflecting the light beam across a field angle, which is provided at a position in the vicinity where the light beam is converged by the converging means, at an equiangular velocity in a scanning direction; and an optical means for reflecting the light beam as directly deflected by the deflection means onto the beam receiving surface so as to linearly move a spot of the light beam substantially at a constant speed on the beam receiving surface, the optical means consisting of a toroidal mirror positioned between the deflection means and the beam receiving surface.

2. The beam scanning optical system as claimed in claim 1, wherein a radius of curvature of the toroidal mirror in a direction perpendicular to the scanning direction becomes smaller according to an increment of the angle of field.

3. The beam scanning optical system as claimed in claim 1, wherein a height of a generatrix of the toroidal mirror is displaced in a reverse direction to a direction of incidence of the light beam according to an increment of the angle of field.

4. The beam scanning optical system as claimed in claim 1, wherein the system fulfills the following conditional equation:

$$0.1 < (d/|R_H|) < 0.7$$

where d is a distance from a point of deflection of the deflection means to the toroidal mirror, and $R_H$ is a radius of curvature of the toroidal mirror in the scanning direction.

5. The beam scanning optical system as claimed in claim 1, wherein the system fulfills the following conditional equation:

$$0.5 < (|d'/d|) < 2$$

where d is a distance from a point of deflection of the deflection means to the toroidal mirror, and d' is a distance from the toroidal mirror to the beam receiving surface.

6. The beam scanning optical system as claimed in claim 1, wherein the system fulfills the following condition equation:

$$0.5 < (|d/R_V|) < 2$$

where d is a distance from a point of deflection of the deflection means to the toroidal mirror, and $R_V$ is a radius of curvature of the toroidal mirror in a direction perpendicular to the scanning direction.

7. The beam scanning optical system as claimed in claim 1, wherein the emitting means includes a semiconductor laser.

8. The beam scanning optical system as claimed in claim 1, wherein the converging means includes a cylindrical lens.

9. The beam scanning optical system as claimed in claim 1, wherein the deflection means includes a polygon mirror.

10. A beam scanning optical system for providing scanning of a beam receiving surface, comprising:
emitting means for emitting a light beam;
converging means for converging the light beam emitted from the emitting means into a straight line;
deflection means for deflecting the light beam across a field angle, which is provided at a position in the vicinity where the light beam is converged by the converging means, at an equiangular velocity in a scanning direction; and reflecting means for directing the light beam as deflected by the deflection means in a nonrefracted state to the beam receiving surface, including a toroidal mirror for reflecting the light beam deflected by the deflecting means onto the beam receiving surface so as to linearly move a spot of the light beam substantially at a constant speed on the beam receiving surface, a height of a generatrix of the reflective surface of the toroidal mirror being displaced in a reverse direction to a direction of incidence on the toroidal mirror of the light beam according to an increment of the angle of field.

11. The beam scanning optical system as claimed in claim 10, wherein a radius of curvature of the toroidal mirror in a direction perpendicular to the scanning direction becomes smaller according to an increment of the angle of field.

12. The beam scanning optical system as claimed in claim 10, wherein the system fulfills the following conditional equation:

$$0.1 < (d/|R_H|) < 0.7$$

where d is a distance from a point of deflection of the deflection means to the toroidal mirror, and $R_H$ is a radius of curvature of the toroidal mirror in the scanning direction.

13. The beam scanning optical system as claimed in claim 10, wherein the system fulfills the following conditional equation:

$$0.5 < (|d'/d|) < 2$$

where d is a distance from a point of deflection of the deflection means to the toroidal mirror, and d' is a distance from the toroidal mirror to the beam receiving surface.

14. The beam scanning optical system as claimed in claim 10, wherein the system fulfills the following conditional equation:

$$0.5 < (|d/R_V|) < 2$$

where d is a distance from a point of deflection of the deflection means to the toroidal mirror, and $R_V$ is a radius of curvature of the toroidal mirror in a direction perpendicular to the scanning direction.

15. The beam scanning optical system as claimed in claim 10, wherein the emitting means includes a semiconductor laser.

16. The beam scanning optical system as claimed in claim 10, wherein the converging means includes a cylindrical lens.

17. The beam scanning optical system as claimed in claim 10, wherein the deflection means includes a polygon mirror.

18. A beam scanning optical system for providing a scan line of a light beam across a surface, comprising:
emitting means for emitting a light beam;
converging means, downstream of the emitting means, for converging the light beam into a substantially straight line;
deflection means, downstream of the converging means, for deflecting the light beam across a field angle at an equiangular velocity in a scanning direction; and
a toroidal mirror means, positioned downstream of the deflection means for directly receiving the deflected light beam, for reflecting the light beam directly to the surface so as to linearly move the light beam at a constant speed across the surface between both edge positions of the scanning line.

* * * * *